(No Model.) 6 Sheets—Sheet 1.

D. S. SEYMOUR.
BREECH LOADING FIREARM.

No. 530,966. Patented Dec. 18, 1894.

Witnesses:

Inventor:

(No Model.) 6 Sheets—Sheet 2.

D. S. SEYMOUR.
BREECH LOADING FIREARM.

No. 530,966. Patented Dec. 18, 1894.

Witnesses:

Inventor:

(No Model.) 6 Sheets—Sheet 3.

D. S. SEYMOUR.
BREECH LOADING FIREARM.

No. 530,966. Patented Dec. 18, 1894.

Witnesses:

Inventor:

(No Model.) 6 Sheets—Sheet 4.

D. S. SEYMOUR.
BREECH LOADING FIREARM.

No. 530,966. Patented Dec. 18, 1894.

Witnesses:

Inventor:

(No Model.) 6 Sheets—Sheet 6.

D. S. SEYMOUR.
BREECH LOADING FIREARM.

No. 530,966. Patented Dec. 18, 1894.

Witnesses:

Inventor:

UNITED STATES PATENT OFFICE.

DUDLEY S. SEYMOUR, OF HARTFORD, CONNECTICUT, ASSIGNOR OF ONE-HALF TO JOHN JOHNSTON, OF SAME PLACE.

BREECH-LOADING FIREARM.

SPECIFICATION forming part of Letters Patent No. 530,966, dated December 18, 1894.

Application filed May 2, 1894. Serial No. 509,781. (No model.)

*To all whom it may concern:*

Be it known that I, DUDLEY S. SEYMOUR, of Hartford, Connecticut, have invented a new and useful Improvement in Firearms, of which the following description and claims constitute the specification, and which is illustrated by the accompanying six sheets of drawings.

This invention is a double barrel breech loading fire-arm; which may have a magazine shot gun barrel, and a hand loaded breech loading rifle barrel on one stock, and independently discharged by one lock, or may have a magazine loading rifle barrel, and a hand loaded shot gun barrel on one stock with one lock, or may have two rifle barrels, or two shot gun barrels of different calibers, the lower one being preferably loaded from a magazine; and the object of the invention is to enable a hunter when he finds a fur bearing animal, to shoot it from the rifle barrel, and on meeting feathered game to shoot the latter from the shot barrel, or when provided with such a gun having two shot barrels of different calibers, to use the large one in shooting large feathered game, and the small one in shooting small feathered game.

Fig. 5ª, is a vertical section, on the line *c c*, of Fig. 1. Fig. 6ª, is a vertical longitudinal section of the breech block, with the parts in the positions occupied by them immediately after firing the lower barrel; and the locking block 14 and the toggle piece 18, are also shown in this view, though they are between the eye and the plane of the vertical section of the breech block, which is shown in the view. Figs. 12 to 18, inclusive, represent a modified form of the upper firing pin, and its adjuncts; which modified form of firing pin, moves into and out of its firing position laterally, instead of axially; and Figs. 12, 13, 14, and 15, correspond otherwise, in positions of the parts, with Figs. 7, 8, 9, and 10, respectively; while

The numeral 1, indicates the receiver; while 2 is the magazine barrel; and 3 is the shot barrel; and 4 is the rifle barrel, above the shot barrel; and 5 is a collar, which surrounds and reciprocates upon the magazine barrel, and works the slide 6.

Figure 1:
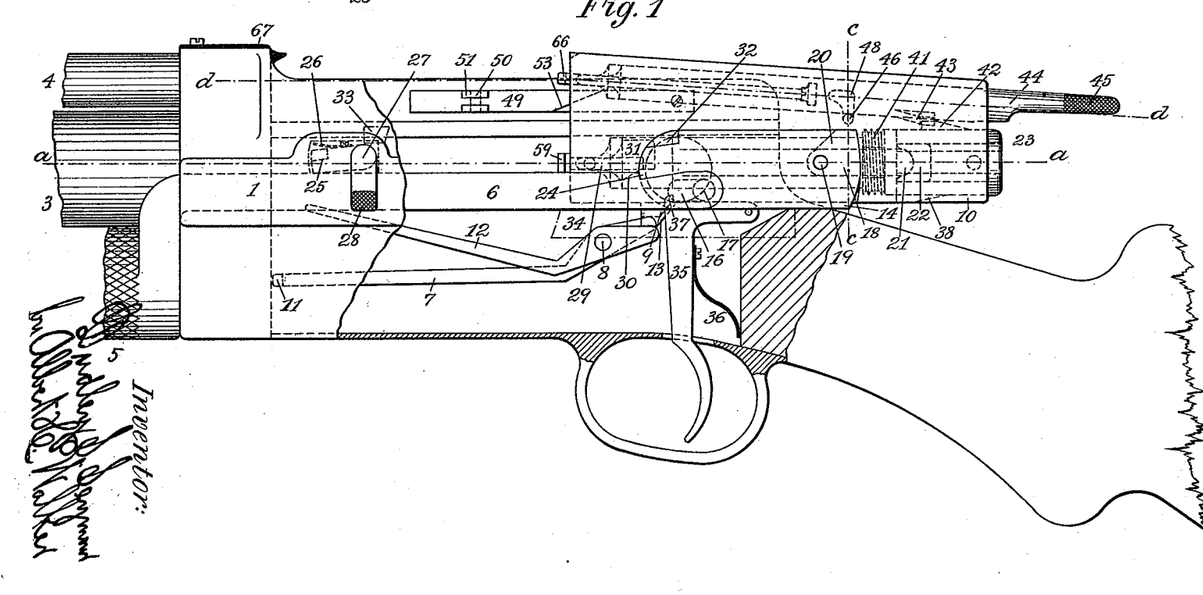
Figure 1, of the drawings, is a side view of the receiver, and the breech block mechanism; a portion of the front wall of the receiver being broken away, and the breech block being shown in its open position, with the upper firing pin turned out of engagement.
Figure 3:
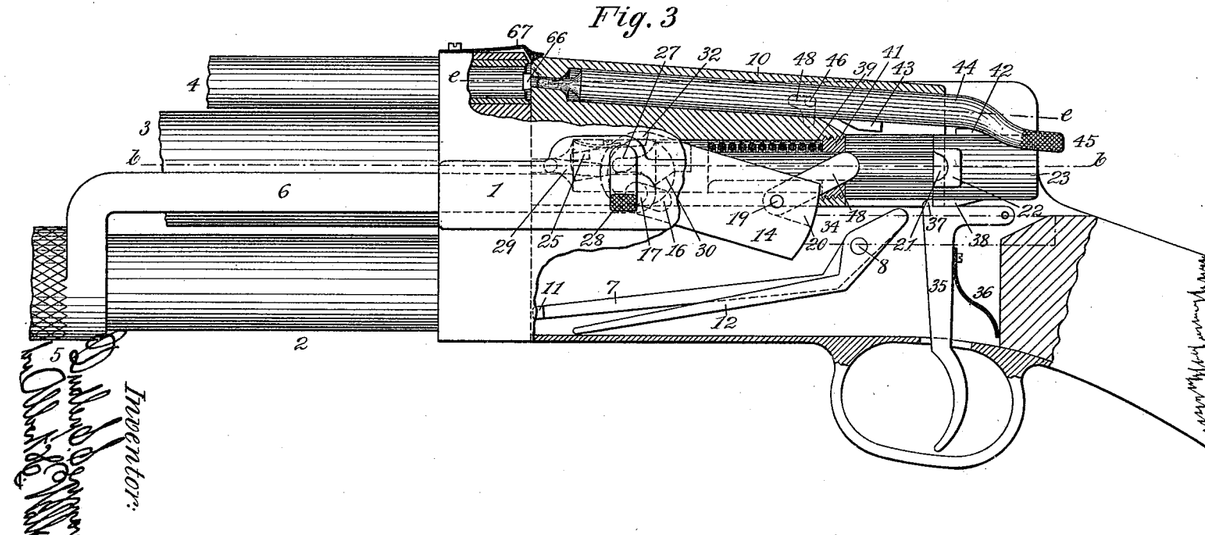
Fig. 3, is a side view of the receiver and the breech block mechanism; a portion of the front wall of the receiver being broken away, and the breech block being shown locked in its closed position, and the lower firing pin drawn back and held by the trigger, and the upper firing pin turned into engagement, and thus into its firing position.
Figures 5, 5A, 6, 6A, 19:
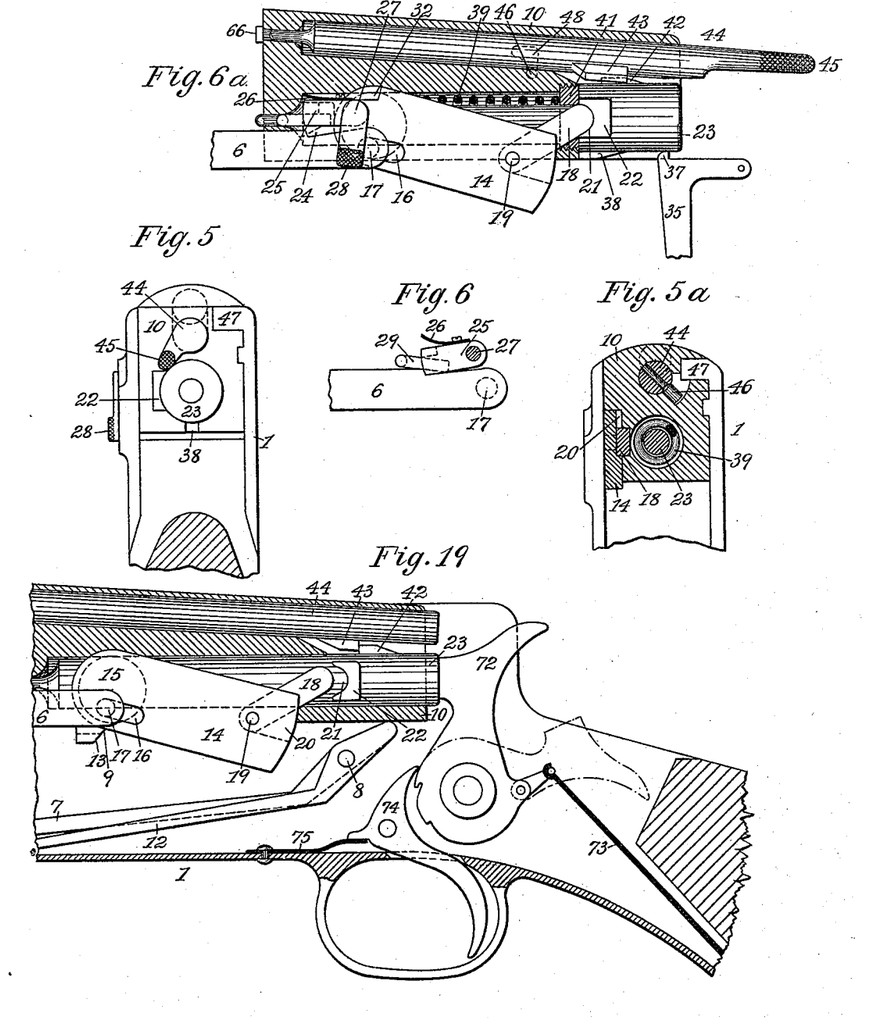
Fig. 5, is an end view, looking from the right of Fig. 3.
Fig. 6, is a detailed view of the latch 25, and the slide 6, locked by that latch in the same positions occupied by those parts in Fig. 3.
Fig. 19, is a side view showing another modification of this gun, wherein a hammer exists to strike the lower firing pin, and thus force it forward, instead of employing a spring to directly force that pin forward, when it is released from the trigger.

The lever or cartridge stop 7, is turned upon the pivot 8, by the cam 9, which projects downward from the breech block 10, whenever the breech block is carried to its most open position, so as to raise that lever from its position shown in Figs. 3 and 19, to that shown in Fig. 1; in which latter position the laterally extending end 11, of the lever 7, stops the cartridges in the magazine barrel from being forced, by the usual spring in that barrel, backward into the receiver. When the lever 7, is in its position shown in Figs. 3 and 19, its end 11, as well as its body, is diagonally below the path of the cartridges, so that one cartridge is forced back into the receiver, and rides upward upon the lever or cartridge lifter 12. That lever is also turned upon the pivot 8, by the cam 13, on the breech block when the breech block 10 is carried back to its most open position, so that the body of that lever is raised from its position as shown in Figs. 3 and 19, to that shown in Fig. 1. That operation lifts the cartridge upon the body of the lever 12, to about the level of the shot barrel 3; so that when the breech block is carried home to its closed position, it drives that cartridge into the shot barrel. The breech block 10, is carried backward and forward, between its various positions, by the slide 6; but that slide, instead of being attached directly to the breech block, is attached thereto by means of the intermediate mechanism specified in the next paragraph.

Figure 2:
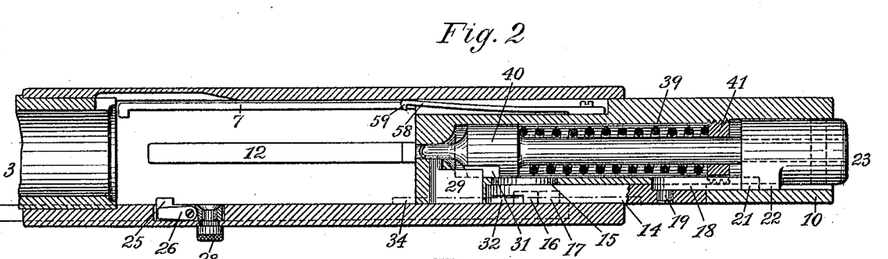
Fig. 2, is a plan view, on the horizontal sectional line *a a*, of Fig. 1.
Figure 4:
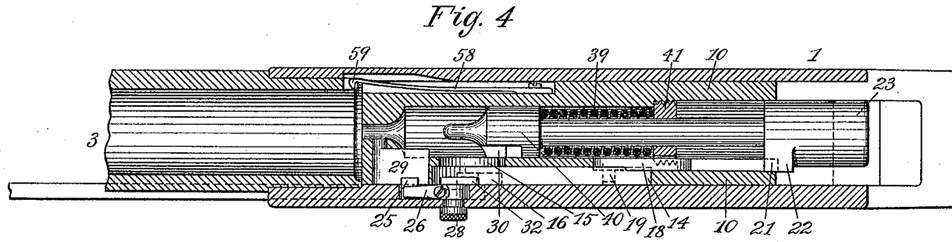
Fig. 4, is a plan view, on the horizontal sectional line *b b*, of Fig. 3.

The locking block 14, has the trunnion 15, which is seated and turns in the recess, in the breech block 10, which it is shown to occupy, in Figs. 2, 4, and 19. The slot 16 extends horizontally through the block 14, parallel with its longitudinal center; and the stud 17, projects inward from the inner side of the rearward end of the slide 6, and engages with that slot, and works backward and forward therein. The toggle piece 18, is attached by the pivot 19, to the inner side of the block 14, in the shallow recess 20, in that block; and the rearward end of that toggle piece is semi-circular in side view, and engages with the semi-circular recess 21, in the forward side of the bracket 22, which bracket extends sidewise from the head of the primary or lower firing pin 23.

The upper side of the slide 6, is provided with a notch 24, for engagement with the latch 25, which latch is carried into engagement by the spring 26, and may be carried out of engagement, through the rocking pivot 27, by the arm 28, which pivot works in a bearing in the side wall of the receiver, and which arm is on the outside of the receiver and is adapted to be worked, by the left hand of the gunner; and the latch 25, is also carried out of engagement, with the notch 24, by the lifting operation of the wing 29, pivoted in the breech block, whenever the rearward end of that wing is itself lifted by the inclined plane 30, which constitutes a part of the bottom of the recess 31, cut in the side of the head of the firing pin 23.

The upper side of the forward end of the block 14, is provided with the recess 32, the bottom of which inclines from front to rear, upward from the longitudinal center of the block, and the projection 33, extends inward, from the inside of the receiver, so as to engage with that recess, when the breech block, carrying the block 14, is forced home to its closed position.

The ledge 34, extends inward from the inward side of the receiver, for engagement with the block 14, when that block is forced downward, by the projection 33, working on the inclined bottom of the recess 32, which event occurs whenever the breech block is carried forward to its closed position. The trigger 35, is provided with the spring 36, and with the detent 37; which latter engages with the downwardly extending fin 38, of the base of the lower firing pin 23, and the middle portion of that firing pin is surrounded by the spiral spring 39, between the annular enlargement 40, which constitutes the head of the firing pin, and the annular bushing 41, which surrounds the shank of the firing pin, and is firmly fixed within a screw-threaded recess in the breech block. The lower firing pin 23, is provided with the upwardly extending fin 42, for engagement with the downwardly extending fin 43, of the secondary or upper firing pin 44.

Figure 9:
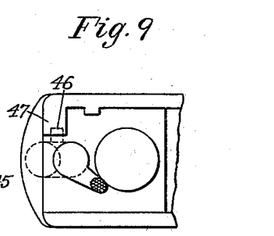
Fig. 9, is an end view, looking from the right of Fig. 8.
Figure 10:
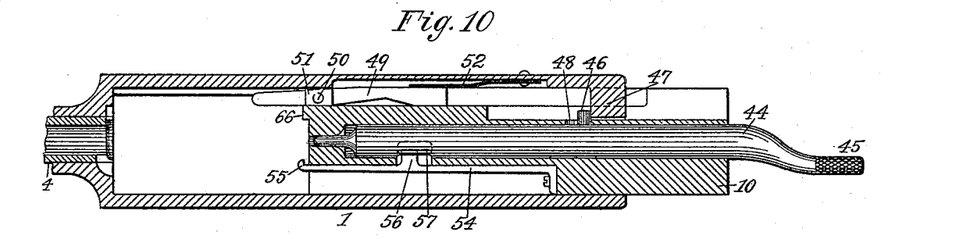
Fig. 10, is a plan view, like that of Fig. 8, except that the breech block is in its midway position, instead of being in its closed position, shown in Fig. 8, or in its most open position, shown in Fig. 7.
Figure 11:
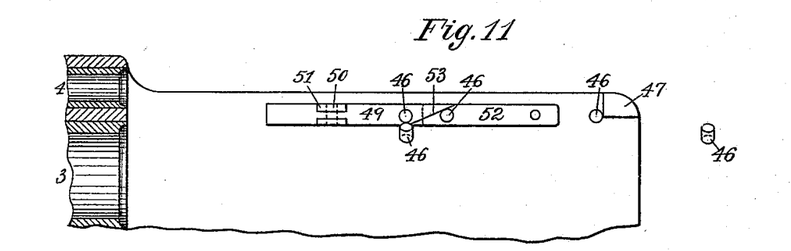
Fig. 11, is a sectional side view of the receiver, showing the switch which automatically turns the upper firing pin out of its firing position.

The upper firing pin is provided with the eccentrically disposed handle 45, for turning it upon its axis, and is also provided with the laterally extending stud 46, which collides with the abutment 47, as shown in Figs. 9 and 10, when that firing pin is turned in one direction upon its axis; but which escapes that abutment when that firing pin is turned in the other direction upon its axis, as shown in Figs. 5ª and 7. The stud 46, works in the recess 48, which is cut through the adjacent wall of the breech block 10, and has the nearly triangular shape shown in Figs. 1, 3, and 6ª.

The switch 49, is a lever, which turns upon the pivot 50, in the bracket 51, which extends inwardly from the inside of the receiver; and the longer end of that lever is forced toward the upper firing pin 44, by the spring 52. The switch 49, when seen in side view, presents parallel upper and lower edges, the latter being much shorter than the former; because the rearward end of the lever is beveled from below, upward and backward, so as to constitute the cam 53, the inclined surface of which is laterally horizontal, though longitudinally inclined; and the switch 49, when seen in plan view, has the outline shown in Figs. 7, 8 and 10, and has its upper surface flat and plain.

Figure 8:
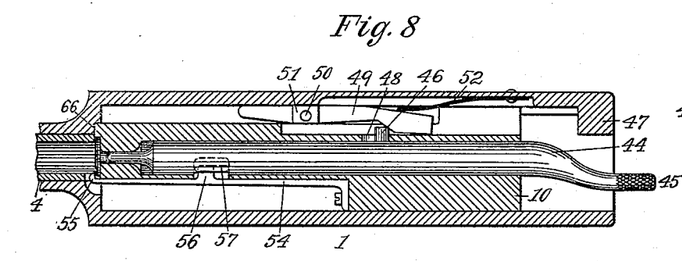
Fig. 8, is a plan view, on the sectional line *e, e*, of Fig. 3.

The upper extractor 54, is a spring, the fixed end of which is attached to the breech block 10, horizontally opposite to the upper firing pin, and the free end of which is provided with the hook-like projection 55, for engagement with the rim of the rifle cartridge, as shown in Fig. 8; and the middle of which is provided with the projection 56, for engagement with the eccentrically inclined surface 57, on the side of the upper firing pin 44.

The lower extractor 58, is a spring, the fixed end of which is attached to the breech block, horizontally opposite to the lower firing pin, and the free end of which is the hook-like projection 59, which is adapted to engagement with the rim of the shot gun cartridge.

The forward face of the breech block is provided with the lug 66, horizontally opposite to the upper extractor, for co-operation with that extractor and the upper firing pin, in ejecting the rifle cartridge shell from the receiver.

The spring 67, is fixed to the receiver, and holds the rifle cartridge shell in the breech of the rifle barrel, as shown in Fig. 1, whenever the breech block is open, and a cartridge shell is in the rifle barrel; but whenever the breech block is closed, the spring is forced by the breech block upward to its idle position of Fig. 3.

Figure 7:
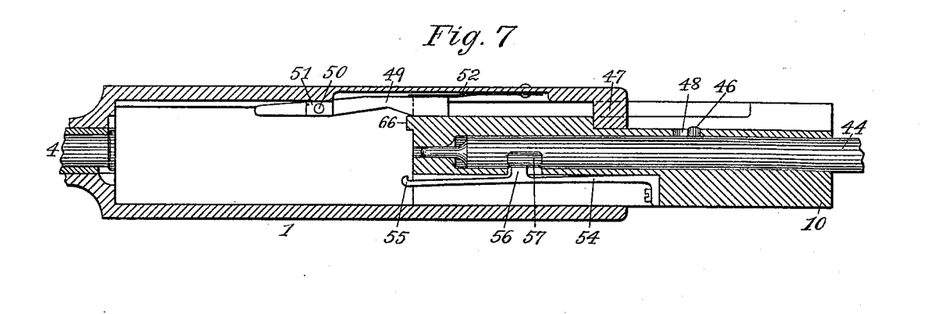
Fig. 7, is a plan view, on the sectional line *d, d*, of Fig. 1, and is a projection from that figure, and shows the upper firing pin, turned out of engagement, into its non-firing position.
Figure 12:
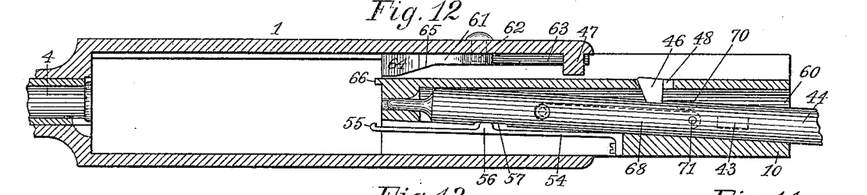
Figure 13:
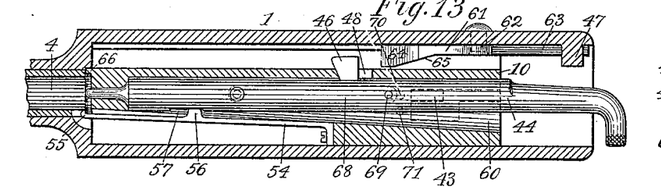
Figure 14:
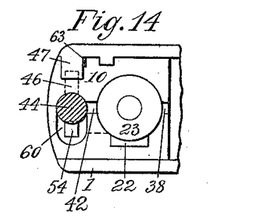
Figure 15:
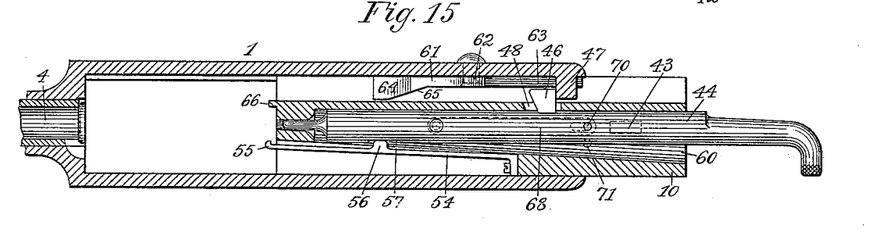
Figure 16:
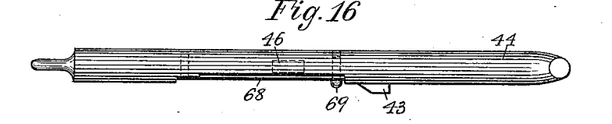
Fig. 16, is a side view of the laterally moving upper firing pin.
Figure 17:
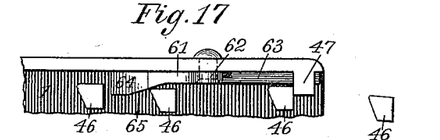
Figs. 17, and 18, are a plan and a side view respectively, of a portion of the receiver and of a switch which corresponds in function with that of Fig. 11.
Figure 18:
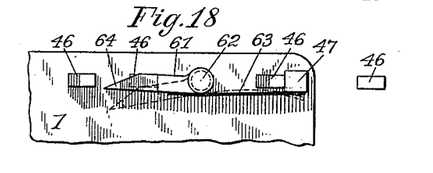
Figure 20:
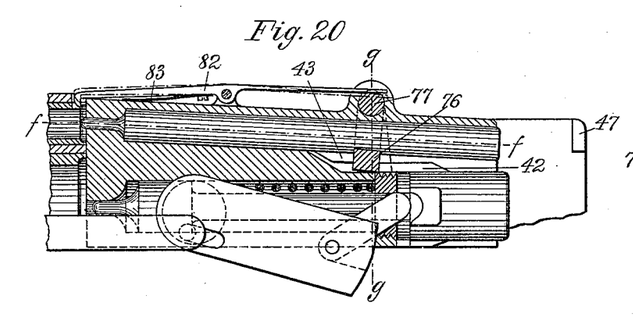
Fig. 20, is a side view of another modification of this firearm, wherein an intermediate dog is employed between the two firing pins.
Figure 21:
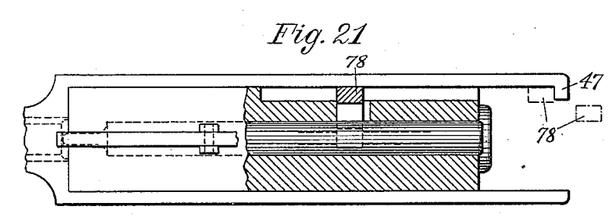
Fig. 21, is a plan view, partly of the exterior of Fig. 20, and partly on the line *f, f*, thereof.
Figure 22:
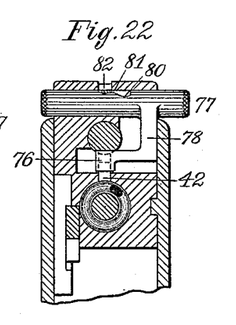
Fig. 22, is a vertical section on the line *g, g*, of Fig. 20, where the intermediate dog is in its working position.
Figure 23:
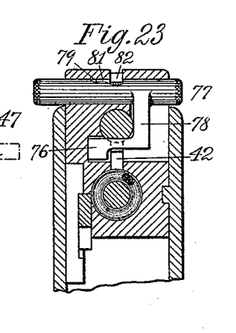
Fig. 23, is like Fig. 22, except that it shows the dog in its idle position.

The modified form of the upper firing pin 44, and its adjuncts, shown in Figs. 12 to 18 inclusive, may now be described. The receiver 1, has the abutment 47, and is also otherwise like the receiver 1, in the preceding figures. The breech block 10, is mainly like the breech block 10, in the preceding figures; but the recess therein, for the reception of the upper firing pin, instead of being cylindrical throughout, is so only at its forward end, and is gradually enlarged laterally, from that end to its rearward end, where it is nearly twice as wide as it is high, as shown at 60, in Figs. 12 to 15, inclusive. The upper firing pin is still provided with the fin 43, for engagement with the fin 42, of the lower firing pin; and is also provided with a modified stud 46, which collides with the abutment 47, as shown in Fig. 15, when that firing pin is moved to the right side of its recess; but which escapes that abutment when that firing pin is moved to the left side of its recess as shown in Fig. 12. This stud 46, works in the recess 48, which is cut through the adjacent wall of the breech block; but instead of having the nearly triangular shape shown in Figs. 1 and 3, so as to allow of revolving as well as of longitudinal movement, of the firing pin, it has a rectangular shape, and a width only equal to the thickness of the stud 46, so as to prevent the firing pin 44, from turning on its axis. The upper extractor 54, like that shown in Figs. 7, 8 and 10, is a spring, the fixed end of which is attached to the breech block 10, and the free end of which is provided with the hook-like projection 55, for engagement with the rim of the rifle cartridge, as shown in Fig. 13; and the middle of which is provided with the projection 56, for engagement with the surface 57, on the side of the firing pin. The switch 61, turns upon the pivot 62, and is held in the full line position shown in Fig. 18, by the spring 63, except when it is forced to the dotted position shown in Fig. 18, by the backward passage of the stud 46, working on the cam 64, on the forward end of the switch 61. If the firing pin 44, is in the position shown in Fig. 15, just before the breech block is moved forward to its closed position, the stud 46, in the course of that movement, strikes the cam 65, of the switch 61, and that cam thus forces the upper firing pin to the left side of the seat of the latter; and that firing pin is held in position in the right or the left side of its seat, as the case may be, by the spring 68 which occupies a flat bottom recess in the lower side of that firing pin, and the fixed end of which is riveted thereto, and the moving end of which is provided with the stud 69, for engagement with the recess 70 or 71, as the case may be, in the floor of the seat 60, of that firing pin.

The modification of this gun, which is shown in Fig. 19, consists in omitting the spiral spring 39, and the downwardly extending fin 38, from the lower firing pin; and in supplying the hammer 72, worked by the spring 73, for driving that firing pin forward; and in substituting the trigger 74, and its spring 75, for the trigger 35 and its spring 36, as the means of discharging the firearm.

The modification of this gun, which is shown in Figs. 20 to 24, consists in connecting the two firing pins by means of the intermediate dog 76; and in employing the slide 77, which moves that dog, for the additional purpose of putting the upper cartridge shell extractor, in and out of engagement with the rifle cartridge; and in using the arm 78, which connects that dog with that slide, for the purpose of stopping the breech block, at its midway position, when it is carried backward, while the upper firing pin is in engagement, through the dog 76, with the lower firing pin. The slide 77 is provided with the recesses 79 and 80, which are separated by the low elevation 81, which slopes gently to them, and the latter of which recesses is deeper than the other. The cartridge shell extractor 82, is on top of the breech block, and is a lever of the first order, the power arm of which is elastic, and the other arm of which is provided with the spring 83, of less resistance than the elastic arm. The fins 42 and 43, of the lower and upper firing pins, respectively, extend far enough to engage with the dog 76, when it is between them, as in Fig. 22, but not far enough to engage with each other when the dog is not between them, as in Fig. 23, and that dog may engage with those firing pins, otherwise than by means of such fins, as for example by means of a shallow recess in the opposite sides of the firing pins.

The mode of operation of this firearm is as follows: Starting with the parts in the positions shown in Figs. 1 and 2, it is assumed that the magazine barrel is supplied with shot-cartridges, which are prevented, by the laterally extending end 11, of the cartridge stopper from being forced by the magazine spring into the receiver; and that one shot cartridge rests upon the cartridge lifter 12, with its point forward; and that one rifle cartridge has been placed by the gunner in the breech of the rifle barrel. Thereupon the gunner slides the collar 5 forward, as far as it will go, and thus draws the breech block and its appurtenances, forward to the closed position shown in Figs. 3 and 4. Very shortly before the breech block reaches that position, the projection 33, strikes the inclined bottom of the recess 32, and, as the breech block moves still farther forward, that projection, acting on that inclined surface, forces the locking block 14, to turn upon its trunnion 15, from its horizontal position, to its downwardly inclined position, shown in Fig. 3; and that movement results in locking the breech block in its closed position, by means of carrying the rearward end of the locking block 14, down, along and against the forward face of the ledge 34, which ledge is integral with the side wall of the receiver, and extends inwardly therefrom, as shown in Fig. 2. The same movement also, results in drawing the toggle piece 18, from its horizontal position down to its inclined position shown in Fig. 3. The forward movement of the breech block also carries the cams 9 and 13 away from the shorter ends of the levers 7 and 12, respectively, and thus allows those levers to fall from their positions shown in Fig. 1, to those shown in Fig. 3; at the same time that the forward end of the breech block forces the shot cartridge, which has been resting on the lever 12, into the breech of the shot barrel; and the depression of the levers 7 and 12, allows another shot cartridge to be forced by the spring in the magazine barrel, backward into the receiver, and upon the lever 12, without colliding with the laterally extending end 11, of the lever 7; which, in that position, is below the path of the cartridge because it is below the plane of its horizontal diameter. When the breech block 10, reaches its closed position, the spring 26, forces the latch 25, down into the notch 24, in the slide 6, and thus locks that slide against being operated to open the breech block, until such time as the latch is removed from the notch. It may thus be removed by the hand of the gunner, pushing forward the arm 28 at any time; but if the slide 6 is not unlocked in that way, it remains locked until it is automatically unlocked, by the discharge of the firearm. During the forward movement of the breech block, also, the projecting fin 38, of the firing pin 23, collides with the detent 37, of the trigger 35 of Fig. 1; and the further progress of the closing of the breech block, holds the firing pin backward relatively thereto, against the resistance of the spring 39, so that when the breech block is completely closed, that firing pin and its spring 39, occupy the constrained position shown in Fig. 3. The forward movement of the breech block, where the upper firing pin turns upon its axis, as in the form shown in Figs. 7 to 11 inclusive, carries the stud 46, of that firing pin, past the abutment 47, and past the switch 49, without touching either of them; because before that movement began, the gunner, according to the rule of the gun, turned the eccentric handle of the firing pin 44, from the downwardly inclined position, shown in Figs. 7, 8, and 9, upward to the horizontal position, shown in Fig. 1, so as to turn the stud 46, downward from its horizontal position, shown in Figs. 8, 9, and 10, to its inclined position, shown in Figs. 1, 5ª, and 7. This latter position is the non-firing position of the upper firing pin; because in it the stud 46, occupies the rear and lower part of the recess 48, as shown in Fig. 1, and thus holds the upper firing pin back so far that its point is behind the plane of the forward face of the breech block; and because the fin 43, of the upper firing pin is turned into quadrature, and out of alignment with the fin 42, of the lower firing pin, as shown in Fig. 6ª. In this situation of the parts, if the gunner pulls the trigger, the lower firing pin is shot by the spring 39, forward into the base of the shot cartridge, in the shot barrel, and that barrel is thus discharged. Near the end of the forward shot of the lower firing pin, its inclined surface 30, drives under the pivoted wing 29, and lifts the rearward edge of the latter; and that wing in turn lifts the latch 25, against the resistance of the spring 26, out of the notch 24, of the slide 6, into the position shown in Fig. 6ª. The slide 6 being thus unlocked, the gunner forces the collar 5, backward along the magazine barrel. The first result of that motion is to force the stud 17, which is rigidly fixed to the inner side of the rearward end of the slide 6, backward along the slot 16; and that forcing raises the block 14, from its position shown in Fig. 3, to a horizontal position, and thus unlocks the breech block, by carrying the rearward end of the block 14, above and away from the forward face of the ledge 34. In order to prevent the ledge from binding the forward end of the block 14 against this motion, that block is not cut on an arc of a circle of which the center of the trunnion 15, is the center, but is cut on a curve which gradually and slightly tends toward that center, as it progresses from its upper end to its lower end. This upward motion of the block 14, also starts the breech block moving backward with power greater and speed slower than that of the slide 6; because the rear part of the block 14 then acts like a compound of a lever and an inclined plane; the fulcrum of the lever being the projection 33, and the weight point being the center of the trunnion 15, and the power place being the upper side of the slot 16, along which the stud 17, slides as upon an inclined plane. This sacrifice of speed to power operates to powerfully start the shot cartridge shell, from the breech of the shot barrel where it may have been fastened by the expansion of the gases at the time of the discharge. This upward motion of the block 14, also carries upward the toggle piece 18, and inasmuch as the rearward end of that toggle, when the lower firing pin has been shot, occupies the recess 21, in the projection 22, the backward motion of the toggle piece forces the firing pin backward in the breech block, before the breech block begins to move backward itself, and thus counteracts any tendency which the point of the firing pin may have, to stick in the opening which it made in the base of the cartridge shell. This toggle motion also withdraws the point of the lower firing pin within the forward face of the breech block; so that it cannot interfere with the ejection of the cartridge shell, from the receiver, after it has been drawn back into the receiver by the lower extractor 58, when the breech block is carried back from its position shown in Fig. 3, to that shown in Fig. 1; and so that it cannot penetrate the base of the cartridge shell, until after the breech block is locked in its closed position by the locking block 14.

The last eight paragraphs set forth one performance of the program of the gun; when that performance involves the discharge of the shot barrel, and the idleness of the rifle mechanism. When the gunner will discharge the rifle barrel without discharging the shot barrel, the program is the same, except that after the breech block is closed, the gunner turns the eccentric end 45, of the upper firing pin 44, downward from its position in Fig. 1, to its position in Fig. 3. That turning carries the fin 43, into alignment with the fin 42, and carries the stud 46, upward from its position in Figs. 1, and 5ª, to its position in Figs. 3, and 8; and also carries the point 55 of the extractor 54 into engagement with the rim of the rifle cartridge, as shown in Fig. 8, by carrying that part of the eccentric surface 57, which is nearest the axis of the firing pin 44, into position, under the projection 56, of the extractor 54. In this situation of the parts, if the gunner pulls the trigger, and thus releases the lower firing pin, its fin 42, strikes the fin 43, of the upper firing pin; so that the upper firing pin is driven into the rifle cartridge from the rifle barrel, while the lower firing pin is prevented from quite reaching the base of the shot cartridge, because the distance between its point and the striking surface of its fin 42, is a small fraction of an inch less than the distance between the point of the upper firing pin, and the stricken face, of its fin 43; and because the upper firing pin is limited in its forward motion by striking the anvil in the rifle cartridge, at such point as to stop the forward motion of the lower firing pin, before its point can reach the shot cartridge; and the point of the upper firing pin strikes the anvil in the rifle cartridge, and thus stops that firing pin, when its head is about one-sixteenth of an inch back of its seat in the breech block, in order that the firing pin may be a cartridge shell ejector also, as hereinafter described. After the rifle barrel has been thus discharged, the gunner may decide to fire another rifle ball, before discharging the shot barrel; or he may decide to discharge the shot barrel before firing another rifle ball. In either case, after discharging the rifle barrel, as above described, he slides back the collar 5, as far as it will go; but it will not go far enough to carry the breech block to its most open position shown in Figs. 1 and 2, but only to its midway position shown in Fig. 10; because the stud 46, travels back horizontally, unmoved by the switch 49, and collides with the abutment 47, and stops all further backward movement of the breech block and of all parts appurtenant thereto; but though the backward movement of the upper firing pin is stopped when the stud 46, reaches the abutment 47, in the position shown in Fig. 10, the breech block 10, moves about one-sixteenth of an inch farther backward, till the forward end of the slot 48, reaches the forward side of the stud 46. This backward motion of the breech block, while the upper firing pin is stopped, is equivalent to a forward motion of the firing pin, while the breech block is stopped, and it operates to eject the cartridge shell from the receiver, over one of the walls thereof, because the rim of that shell is held against forward movement at one point by the hook 55 of the extractor 54, while the opposite point of the rim is held against lateral, but not against forward movement by the projection 66.

During the backward movement of the breech block, the lower extractor 58, draws the cartridge backward, but not far enough backward to withdraw its forward end from the breech of the shot barrel; but the midway position of the breech block is far enough backward to allow the gunner to insert another rifle cartridge in the breech of the rifle barrel. Having done so, the gunner slides the collar 5, as far forward as it will go; and by so doing, pushes the shot cartridge again into the breech of the shot barrel, and re-adjusts the locking and the other parts appurtenant to the breech block, as above described; but the forward movement of the breech block, this time carries the stud 46, under the cam 53, of the switch 49; and that cam forces the stud 46, downward from its horizontal position, shown in Fig. 10, and backward to its position shown in Fig. 1. Now if the gunner will next discharge the shot barrel, the parts are in position to do so, by simply pulling the trigger 35; but if he decide to discharge again the rifle barrel, before discharging the shot barrel, he prepares for so doing, by depressing the eccentric end 45, of the upper firing pin 44, which restores that firing pin, and its appurtenances, to the firing position, out of which they were automatically thrown, by the cam 53, of the switch 49.

Where this fire-arm contains the modified rifle mechanism, shown in Figs. 12 to 18, instead of that shown in Figs. 7 to 11, inclusive, the mode of operation is the same, except that the upper firing pin is thrown out of engagement, by being carried to the left side of the recess 60, instead of being turned upon its own axis, while its stud 46, is carried out of alignment with the abutment 47, by being carried with the firing pin 44, to the left of that abutment, instead of being depressed diagonally below it, and that stud may thus be carried to the left, not only by the movement of the firing pin 44 in that direction, by the hand of the gunner, and also automatically by the cam 65, of the switch 61; and the backward movement of the stud 46, is unprevented by the switch 61, because the stud, during that movement, strikes the cam 64, and forces the switch downward so as to ride horizontally over its laterally projecting portion. The extractor 54, is operated, by this form of upper firing pin, by means of the direct movement upon its projection 56, of the upper firing pin, instead of by the bottom of a recess which is eccentric to the axis of the firing pin, as in the case of the form of firing pin shown in Figs. 7 to 10, inclusive.

When the fire-arm contains the hammer 72, worked by the spring 73, instead of having the spiral spring 39, and contains the trigger 74, worked by the spring 75, instead of having the trigger 35, worked by the spring 36, the mode of operation is the same as above described, except that the lower firing pin 23, is not held back when the breech block is carried forward, and except that instead of being shot forward some distance, it is driven forward a much shorter distance by a blow of the hammer 72 upon its base.

Figure 24:
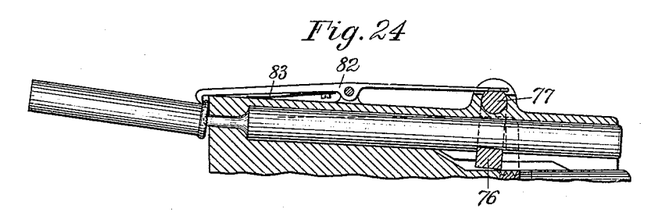
Fig. 24, is a central vertical longitudinal section of the upper part of the breech block, showing the upper firing pin and the upper extractor, ejecting a cartridge shell from the receiver.

When this fire-arm contains the modified mechanism of Figs. 20 to 24, instead of that shown in Figs. 7 to 11, inclusive, the mode of operation is the same as above described except as follows: The upper firing pin is disengaged by moving the dog 76, from its position in Fig. 22, to that in Fig. 23, and the cartridge shell extractor is put into its idle position by moving the slide 77, from its position of Fig. 22, to that of Fig. 23; and it is the arm 78, instead of the stud 46, that stops the backward movement of the breech block, by colliding with the abutment 47, when the upper firing pin is in its firing position, or that passes that abutment when that firing pin is out of that position. When the arm 78 strikes the abutment 47, it swings forward, relatively to the breech block, and, through the dog 76, forces the upper firing pin forward, so that the point of that firing pin, co-operates with the extractor 82, to eject the cartridge shell from the receiver, as indicated in Fig. 24. The extractor 82, is elastic in itself, in order that its hook may ride over the cartridge rim, if the upper firing pin is in engagement with the lower firing pin, when the breech block is being carried forward to its closed position; and the extractor also has the spring 83, to keep it clear of the cartridge, when the upper firing pin is out of engagement with the lower firing pin, and the rear end of the extractor is in the recess 80, of the slide 77.

More than two barrels may be independently discharged, by an equal number of firing pins, with one trigger, when those barrels are mounted on one stock, by enlarging the breech piece, so as to enable it to receive more than one firing pin in addition to the primary firing pin 23, and by connecting each of those additional firing pins with the primary firing pin by a fin 43, capable of being turned into and out of alignment with a fin 42, of the primary firing pin.

I claim as my invention—

1. The combination of two mutually engaging and disengaging firing pins; with means for such engagement and disengagement; so that the secondary firing pin shall receive its blow from or through the primary firing pin, or remain idle, at the option of the gunner; all substantially as described, in that behalf.

2. The combination of two firing pins; the secondary one being provided with a fin or projection for engagement with a fin or projection of the primary one, to be engaged therewith or disengaged therefrom, by being moved into or out of alignment therewith, and so that the secondary firing pin shall receive its blow from or through the primary firing pin, or remain idle as the case may be; all substantially as described, in that behalf.

3. The combination of two mutually engaging and disengaging firing pins; and means for such engagement and disengagement; with the point of engagement between the two firing pins nearer to the nose of the primary firing pin, than to the nose of the secondary firing pin, so that when the two firing pins are in mutual engagement, the primary firing pin is held back by the secondary firing pin from reaching its cartridge; all substantially as described, in that behalf.

4. The combination of a breech block; and a primary and a secondary firing pin seated and working therein; and a stud or arm connected with the secondary firing pin, to limit the backward movement of the breech block, to prevent complete extraction of the cartridge opposite to the other firing pin from the breech of its barrel; substantially as described, in that behalf.

5. The combination of a breech block, provided with a seat for a firing pin in its interior, and a recess in its wall; and a firing pin working in that seat, and provided with a stud, working in that recess, which stud or recess has an inclined side or end, at the place where the stud works in the recess, to draw the firing pin back from its position of possible contact with the cartridge, whenever the firing pin is carried out of its firing position; all substantially as described, in that behalf.

6. The combination of a firing pin, provided with a stud projecting laterally therefrom, and a spring; and a switch having two inclined planes, by means of one of which, the switch is forced out of the path of the stud against the resistance of the spring; and by means of the other of which, the switch forces the stud into a deflected path, and thus automatically moves the firing pin from its firing to its non-firing position; all substantially as described, in that behalf.

7. The combination of a firing pin, which is movable into and out of a firing position; and a cartridge shell extractor, which is carried into engagement with a cartridge shell, by the firing pin, when the firing pin is moved into its firing position, and is carried out of engagement with the cartridge shell, by the firing pin, when the firing pin is moved out of its firing position; all substantially as described, in that behalf.

8. The combination of an axially moving firing pin, having an inclined surface in its side; with a cartridge shell extractor, carried into engagement with the rim of the cartridge shell, by that inclined surface, when the firing pin is turned in one direction upon its axis, and carried out of engagement with the rim of the cartridge shell, by that inclined surface, when the firing pin is turned in the other direction upon its axis; all substantially as described, in that behalf.

9. The combination of a firing pin, provided with the inclined plane 30; with the lifting wing 29, to be raised by that inclined plane; and the latch 25, to be lifted by that wing; and the slide 6, to be locked and unlocked by that latch; substantially as described, in that behalf.

DUDLEY S. SEYMOUR.

Witnesses:
ALBERT H. WALKER,
WILLARD EDDY.